United States Patent
Nenov et al.

(10) Patent No.: US 10,181,948 B1
(45) Date of Patent: Jan. 15, 2019

(54) SECURE STORAGE OF HASHES WITHIN A DISTRIBUTED LEDGER

(71) Applicant: Fortress Cyber Security, LLC, Orlando, FL (US)

(72) Inventors: Dejan Nenov, Boise, ID (US); Roumen Kassabov, Winter Park, FL (US)

(73) Assignee: Fortress Cyber Security, LLC, Orlando, FL (US)

( * ) Notice: Subject to any disclaimer, the term of this patent is extended or adjusted under 35 U.S.C. 154(b) by 0 days.

(21) Appl. No.: 15/880,209

(22) Filed: Jan. 25, 2018

(51) Int. Cl.
*H04L 29/06* (2006.01)
*H04L 9/06* (2006.01)
*H04L 9/32* (2006.01)

(52) U.S. Cl.
CPC .............. *H04L 9/0643* (2013.01); *H04L 9/32* (2013.01); *H04L 63/101* (2013.01)

(58) Field of Classification Search
CPC ........ H04L 9/0643; H04L 9/32; H04L 63/101
USPC ........................................................ 713/168
See application file for complete search history.

(56) References Cited

U.S. PATENT DOCUMENTS

| | | | |
|---|---|---|---|
| 9,934,502 B1* | 4/2018 | Grassadonia | G06Q 20/3226 |
| 2016/0292672 A1* | 10/2016 | Fay | G06Q 20/363 |
| 2017/0235970 A1* | 8/2017 | Conner | G06F 21/6227 707/690 |
| 2017/0316497 A1* | 11/2017 | Song | G06Q 40/02 |

* cited by examiner

*Primary Examiner* — Mohammad W Reza
(74) *Attorney, Agent, or Firm* — Foley and Lardner LLP

(57) ABSTRACT

The present disclosure describes systems and methods for verification of data, including updates to applications, firmware, operating system libraries or other such data. This may be done through the use of a distributed ledger system to provide a secure anti-tamper mechanism for software and firmware updates that may be independently accessed and verified by any device. Distributed ledger systems, sometimes referred to as block chains, are online data storage systems with cryptography-based architecture providing links between records stored in "blocks". Each block contains a hash of a previous block, providing a chain of linked blocks that are immutable: any alteration of a record changes the hash of the subsequent block, which changes the hash of the next subsequent block, etc. Accordingly, any modification of data is easily detectable.

14 Claims, 4 Drawing Sheets

SECURE STORAGE OF HASHES WITHIN A DISTRIBUTED LEDGER

BACKGROUND

Computing devices may receive periodic updates to firmware and software, including system files, anti-virus libraries, configuration files, or other such data. These updates are frequently intended to fix security flaws or holes in prior versions of the firmware or software; however, if the provided update is, itself, corrupted or the system providing the update has been compromised, the update may infect the computing device with malicious software or malware.

SUMMARY

The present disclosure describes a use of a distributed ledger system to provide a secure anti-tamper mechanism for software and firmware updates that may be independently accessed and verified by any device. Distributed ledger systems, sometimes referred to as block chains, are online data storage systems with cryptography-based architecture providing links between records stored in "blocks". Each block contains a hash of a previous block, providing a chain of linked blocks that are immutable: any alteration of a record changes the hash of the subsequent block, which changes the hash of the next subsequent block, etc. Accordingly, any modification of data is easily detectable.

The results of cryptographic hash functions applied to inputs of system or firmware updates provided by a trusted server may be stored in the records. Other devices may receive the updates, generate corresponding hash results, and compare the results to those stored in the ledger system to verify that the received updates have not been compromised by malicious attackers or man-in-the-middle attacks or otherwise corrupted. Even if the trusted server is subsequently compromised, the immutable nature of the ledger system prevents an attacker from modifying the recorded hashes to deceive client devices into executing malware.

BRIEF DESCRIPTION OF THE FIGURES

In the drawings, like reference numbers generally indicate identical, functionally similar, and/or structurally similar elements.

DETAILED DESCRIPTION

Figure 1:
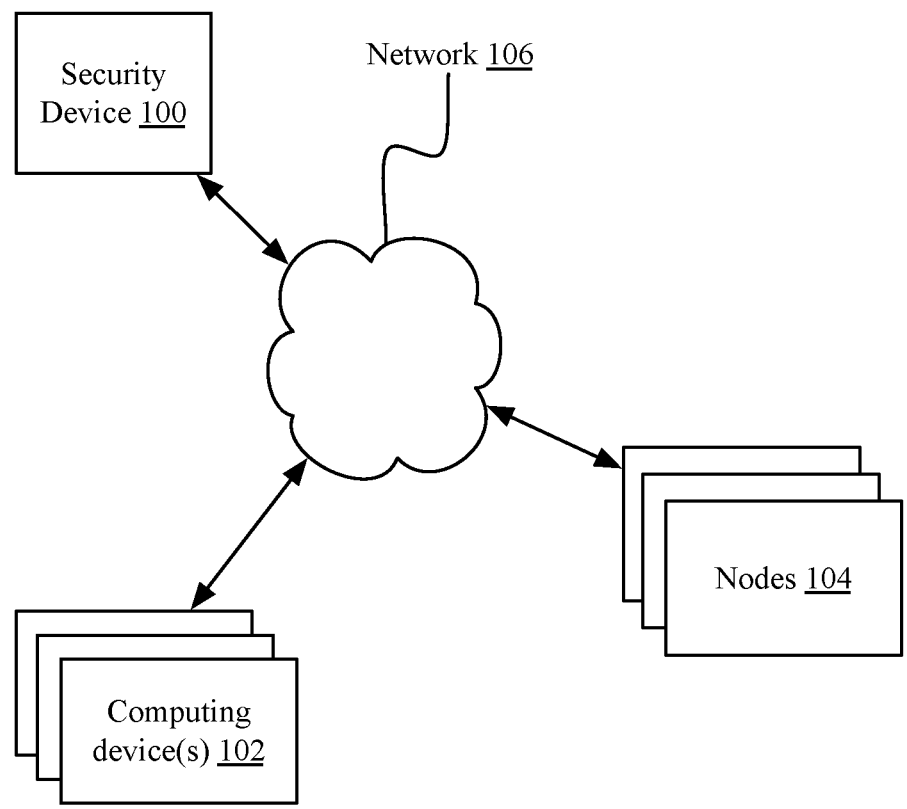
FIG. 1 is a block diagram of an embodiment of a computing environment for secure storage of hashes within a distributed ledger system.

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Computing devices may receive periodic updates to firmware and software, including system files, anti-virus libraries, configuration files, or other such data. These updates are frequently intended to fix security flaws or holes in prior versions of the firmware or software, provide new features, increase efficiency of the computing device, or otherwise improve the operation of the device. The updates may be received from management servers, administrators, device or software manufacturers, operating system manufacturers, or elsewhere. In some implementations, updates may be downloaded directly from a source server (e.g. a manufacturer's server). In other implementations, updates may be downloaded from a third party source (e.g. cloud storage service provider, app store, or other such source). In still other implementations, updates may be provided via a peer-to-peer distribution system, such as via a BitTorrent network. These various distribution systems may have varying levels of trust: for example, one typically may trust a manufacturer to provide proper updates, while one may be less trusting of an update provided by a peer-to-peer network. However, even a manufacturer's servers may be compromised by malicious actors, either remotely or locally (e.g. a rogue employee). Accordingly, regardless of how the update is obtained, it may be corrupted or compromised, and installation may infect the computing device with malicious software or malware. This could result in adverse effects from data loss, "bricking" of a device or making it non-operational, "ransomware" or encryption of user data with decryption keys held hostage, data exfiltration, etc.

Accordingly, the present disclosure provides an independent system by which a device may verify data, including updates to applications, firmware, operating system libraries or other such data. This may be done through the use of a distributed ledger system to provide a secure anti-tamper mechanism for software and firmware updates that may be independently accessed and verified by any device. Distributed ledger systems, sometimes referred to as block chains, are online data storage systems with cryptography-based architecture providing links between records stored in "blocks". Each block contains a hash of a previous block, providing a chain of linked blocks that are immutable: any alteration of a record changes the hash of the subsequent block, which changes the hash of the next subsequent block, etc. Accordingly, any modification of data is easily detectable.

Although typically discussed with records indicating transactions between users, block chains may be used to store any type of data, either in raw form or encrypted. In some implementations, block chains may include executable code that is processed by computing devices, sometimes referred to as nodes or miners, during each iteration of the block chain. This code may be sometimes referred to as a smart contract. Transactions and/or smart contracts (along with other data, parameters, etc.) may be provided to a node. The node may process the contracts and record the transactions to a ledger, along with the cryptographic hash of the previous block, and distribute the new resulting block to other nodes in the network.

Thus, a smart contract used herein may maintain a data array with hash values (e.g. MD5, SHA256, or any other such hash type) and associated index entries corresponding to identifiers of data (e.g. firmware versions, software versions, device identifiers, etc.). For example, the results of cryptographic hash functions applied to inputs of system or firmware updates provided by a trusted server may be stored in the records, or, in some implementations, any other type of data. Hashes may be used to reduce the length of data stored in the ledger, as larger amounts of storage require generation of new blocks, which may be computationally expensive (for example, various block chain systems may place a limit on processing, storage, and bandwidth per block).

Other devices, sometimes referred to as client devices, may receive the updates (e.g. from a server, cloud storage provider, peer-to-peer network, etc.), generate corresponding hash results, and compare the results to those stored in the ledger system to verify that the received updates have not been compromised by malicious attackers or man-in-the-middle attacks or otherwise corrupted. Even if the trusted server is subsequently compromised, the immutable nature of the ledger system prevents an attacker from modifying the recorded hashes to deceive client devices into executing malware.

For example, referring first to FIG. 1, illustrated is a computing environment comprising a security device 100, computing devices 102 (referred to generally as client devices, clients, local or internal devices, server devices, servers, host devices, hosts, or computing devices 102), and nodes 104 (sometimes referred to as full nodes, miners, pools, or by other such terms), via one or more networks 106).

Security device 100, sometimes referred to as a secure device, a trusted device (although this trust may be temporary, such as instances where the security device is subsequently compromised), security server, manufacturer device, or by other such terms, may comprise a computing device that is configured to receive or produce an initial version of data or executable code to be distributed to computing device(s) 102, to generate a cryptographic hash of the data or code, and generate a transaction or execute a smart contract to write the cryptographic hash of the data or code to a ledger of a distributed ledger system (e.g. via a node 104). In many implementations, a security device 100 may be a network security device, such as a switch, router, or gateway providing security services to a home network (e.g. deployed as an intermediary between a first network 106 and a second network 106 (not illustrated) to which computing device(s) 102 are connected). Security device 100 may thus provide security functions to a home network, business network, or local area network (LAN), such as a firewall, packet inspection and/or filtering, network address translation, caching, acceleration, or any other such features. In other implementations, a security device 100 may be a trusted server of a manufacturer or software or firmware provider, and may be an update server, online store, cloud data provider, or other such entity. Security device 100 may provide security through verification and validation of updates via hashes in a distributed ledger, as discussed above.

Security device 100 may comprise a hardware device, such as an appliance, desktop computer, rackmount computer, laptop computer, or any other such device. In some implementations, security device 100 may comprise a virtual device executed by a physical computing device, such as a virtual appliance executed by a physical machine having a hypervisor. Security device 100 may comprise one or more devices, such as a server farm, cluster, or cloud.

In some implementations, network 106 may be provided by a security device 100, such as via a built-in network switch, WiFi access point, etc. In other implementations, one or more network management devices (not illustrated) may be connected to a security device 100 and provide network 106. For example, a network management device, such as a router, gateway, WiFi access point, or other such device, may be an intermediary between security device 100 and network 106, and may provide functionality for network 106 and communications to one or more computing devices, security sensors automation devices, and/or appliances or consumer devices. Accordingly, in some implementations, communications to networked devices from security device 100 may flow through network management devices. Security device 100 may accordingly also provide security for network management devices (e.g. protection from unauthorized access to configuration or control functions, etc.).

As discussed above, security devices 100 may receive trusted or original versions of software and/or firmware updates, applications, system libraries, or any other such data. These versions may be referred to as canonical versions, official versions, master versions, or by other such names. The trusted or canonical version may be explicitly or manually trusted by an administrator or manufacturer of the data, or may be digitally signed (e.g. by a certificate authority) to establish a chain of trust. To provide for secure distribution of the data, the security device 100 may generate a hash of the data by performing a hashing algorithm on the data, such as MD5 or SHA256, or any other suitable hashing algorithm. A hashing algorithm may be considered suitable if it has few or no collisions for the corresponding amount of input data, or if it provides a unique hash result for any input data within the set of potential input data. Depending on the size of the data, different algorithms may be utilized. The security device 100 may generate a transaction for the ledger system or remote procedure call to be executed by a node 104 executing a smart contract to write the hash result into the ledger. The result may be written to the ledger along with an identifier of the data (e.g. software name, version, manufacturer name, unique code such as a universal product code (UPC) or unique resource identifier (URI), or other such identifiers). In some implementations, the security device may generate a request to execute a transaction, the request comprising the identifier and the hash result. The hash result and the identifier may be recorded in the ledger in an array or as a parameter-value pair, and may be independently retrievable by computing devices 102.

In some implementations, a security device 100 may retrieve the trusted version of the data from a specific source, such as a manufacturer computing device or server, and then provide the data for wider distribution, e.g. via a peer-to-peer network. This may allow for efficient distribution to computing devices 102 and large scalability without burdening the manufacturer computing device or server, or the security device 100. While such distribution systems are normally prone to security holes and man-in-the-middle attacks, placing hashes of the data in the immutable distributed ledger for retrieval and comparison by computing device(s) 102 mitigates or prevents such attacks. Accordingly, the resulting update distribution system is highly scalable and secure.

Computing devices 102 may comprise any type and form of computing device, including laptop computers, desktop computers, tablet computers, wearable computers, embedded computers, video game consoles, entertainment systems, "smart" appliances such as smart televisions, smart thermostats, or any other such smart appliance, home automation appliances, energy management devices (e.g. battery backup systems, generators, power conditioners, etc.), or any other such device. In some implementations, computing devices 102 may be deployed within other devices, such as computing devices within cars (e.g. head units). Computing devices 102 may be physical devices, virtual devices executed by one or more physical devices, or a combination of physical and virtual devices. Computing devices 102 may execute software and/or firmware, and may receive updates to software and/or firmware via network 106. As discussed above, in order to verify an update, application, or other such data, a computing device 102 may retrieve or receive the data via any suitable means (e.g. downloading the data from a cloud server or a data provider, via a peer-to-peer network with data shared by other computing devices 102, etc.). The data may be identified with an identifier as discussed above (e.g. URI, UPC, version number, etc.) Prior to installing or executing the data, the computing device 102 may performing a similar hashing algorithm on the data to that performed by security device 100 (e.g. MD5, SHA256, or any other suitable hashing algorithm). In some implementations, the computing device 102 may generate a transaction or remote procedure call to retrieve the hash result from the distributed ledger via the identifier, for example when a node 104 executes a smart contract to process the transaction or RPC. In other implementations, the computing device 102 may retrieve the array or transaction corresponding to the data identifier from a node 104, and extract the hash result generated by the security device 100 for the data. In some implementations, the computing device 102 may compare the locally-generated hash value and the retrieved hash result generated by the security device 100. If the values match, then the data is identical to the canonical copy, and the computing device 102 may install or process the data. If the values do not match, then the data has been modified, corrupted, or compromised. The computing device 102 may notify an administrator or user, may discard the data, and/or may take other mitigation actions (e.g. generating a backup of user data or configurations, locking the system, identifying other device(s) that provided the data as potentially compromised, etc.).

In a similar implementation, a security device 100 may periodically request hashes of data, software, firmware, system libraries or other data stored on computing devices 102. For example, a security device 100 acting as a gateway to a LAN may request hashes of firmware or other data from devices attached to the local area network. The security device 100 may compare the hashes to hashes of canonical versions of the data stored in the distributed ledger (e.g. performing the same retrieval and comparison steps as the computing devices 102 in the implementations discussed above). If the hashes do not match, then the corresponding device or devices providing the hashes may be compromised or corrupted. The security device 100 may perform mitigation actions, such as preventing communications from said devices from being transmitted off the LAN or between the device and other devices on the LAN, notifying a user or administrator, etc. If the hashes do match, then in some implementations, the security device 100 may record a device identifier of the providing device or devices to the ledger as a trusted device (e.g. using a similar technique to recording hashes as discussed above). This can allow other devices to look up device identifiers within the ledger to determine whether a device can be trusted (e.g. whether it safe to exchange data with the device, execute or process data from the device, etc.), by using a similar retrieval technique to those discussed above (e.g. retrieving transactions or arrays, providing a remote procedure call to a smart contract, etc.). Device identifiers may be hashed in some implementations for privacy and obfuscation, and/or to prevent spoofing of trust indications within the ledger. Thus, such implementations can create a scalable, distributed trust authority allowing any device to verify the identity and status of any other device, without having to use certificate authorities that may, themselves, become compromised.

As discussed above, nodes 104 may comprise computing devices used to generate blocks of the ledger, record transactions, execute smart contracts, and generate cryptographic hashes of other block data and/or block contents. Nodes 104 may each comprise one or more computing devices, such as desktop computing devices, rackmount computing devices, laptop computing devices, appliances, clusters, server farms, or any other type and form of computing devices. In many implementations, a large number of physical computing devices will be configured to operate together for generating blocks and processing transactions, e.g. as a pool or swarm.

Networks 106 may comprise any type and form of network, including a local area network (LAN), wide area network (WAN) such as the Internet, a wireless network, a cellular network, a satellite network, a cable network, or any combination of these or other networks. Additional devices not illustrated may be deployed on networks 106, including switches, gateways, routers, firewalls, or other such devices. Computing devices 100, 102, 104 may comprise any type and form of computing device, including desktop computers, laptop computers, tablet computers, smart phones, smart televisions, game consoles, wearable computers, networked devices or appliances such as IoT devices, server computers, workstations, or any other type and form of networked computing device, and may be variously referred to as servers, clients, hosts, remote devices, local devices, or by any other such name.

Figure 2A:
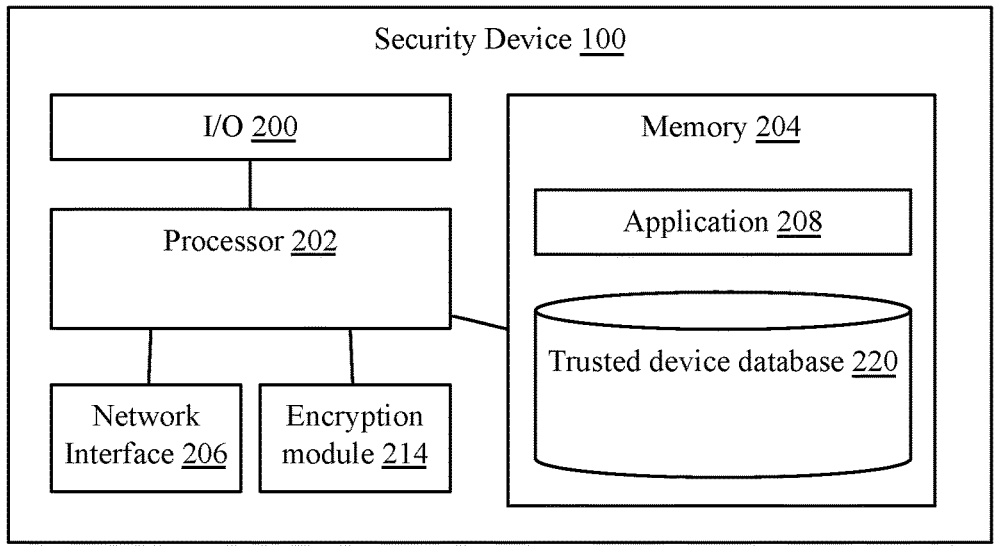
FIGS. 2A-2B are block diagrams of embodiments of servers and computing devices.
Figure 2B:
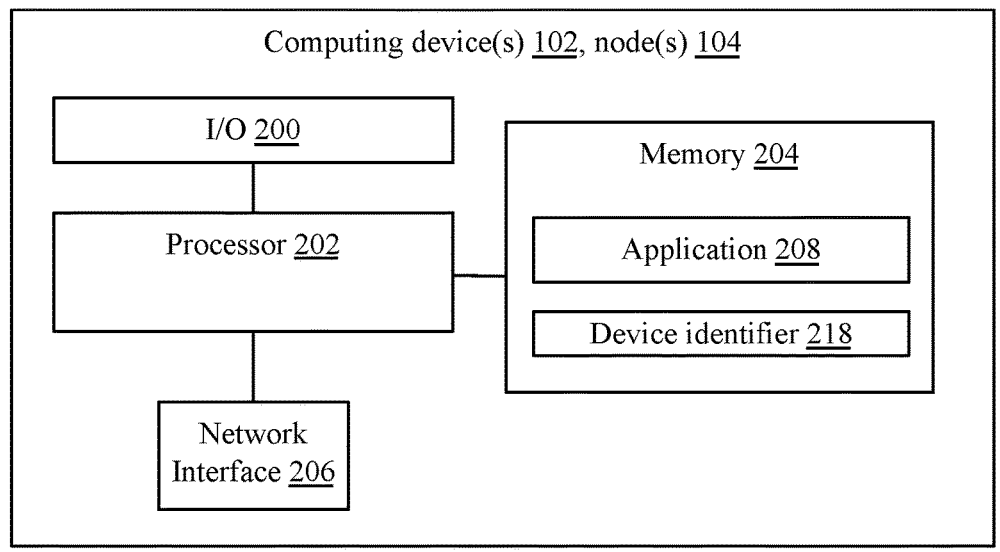

FIGS. 2A-2B are block diagrams of embodiments of servers and computing devices, such as security devices 100, computing devices 102, and nodes 104. Referring first to FIG. 2A, illustrated is a first implementation of a security device 100. As discussed above, a security device 100 may comprise a laptop computer, desktop computer, wearable computer, portable computer, smart phone, tablet computer, rack mount computer, blade server, appliance, or any other type and form of device. In some implementations, a security device 100 may not include all of elements 200-220 illustrated, or may include a plurality of any of elements 200-220 or other elements. For example, in one implementation, a security device 100 may comprise a plurality of network interfaces 206. Furthermore, although illustrated as a single device, in many implementations as discussed above, a security device 100 may comprise a plurality of security devices 100 in communication via a network, such as a separate switch and firewall, or any other combination of these or other devices. In some implementations, a security device 100 may comprise a virtual device or virtual machine, executed by a physical machine.

A security device 100 may include one or more processors 202. A processor 202 may comprise a central processing unit (CPU), microprocessor, application-specific instruction-set (ASIC) processor, or any other type and form of processor for receiving, analyzing, filtering, blocking, modifying, and/or retransmitting packets, and processing sensor signals and applying correlation rules. A processor 202 may communicate with one or more network interfaces 206, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 206 may be used for receiving and transmitting packets, as well as performing many types of data extraction and processing on the packets. Network interfaces 206 may communicate with computing devices 102 and nodes 104 via a network 106 (not illustrated), which may comprise any type and form of network or networks, including a LAN and/or WAN such as the Internet. For example, in many implementations, a security device 100 may connect to a first LAN, which may connect to the Internet, which may further connect to a second LAN connected to client devices. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

Although a network interface may typically refer to computer networks or even packet-based networks, a network may also refer to serial or parallel connections to sensors, relays, motors, or other security devices. Accordingly, as shown, in many implementations network interface 206 may also refer to serial connections, GPIO connections, as well as WiFi interfaces, Bluetooth interfaces, Ethernet interfaces, power line communications interfaces, or other interfaces not illustrated. In other implementations, some or all of these features may be provided separately from network interface 206.

A network interface may include a network stack, which may comprise processing and functionality for a plurality of layers of the stack, including a physical layer, network layer, transport layer, session layer, presentation layer, application layer, or any other such layers. The network stack may comprise routines for encapsulating and de-encapsulating headers and payloads of packets at various layers, and may provide functionality for one or more protocols at any layer of the network stack.

A security device 100 may execute a packet processing engine, which may be part of the network interface 206 or network stack, or may be executed separately by a processor 202. A packet processing engine may comprise an application, service, server, daemon, routine, or other executable logic for processing packets, including performing network address translation, encryption, decryption, compression, decompression, modification of headers or payloads, buffering, caching, pooling, multiplexing, fragmentation or defragmentation, error correction, retransmission handling such as for a lossless protocol, or any other type and form of processing. In some implementations, a packet processing engine may extract data or identifiers from a packet for analysis and filtering, such as extracting IP addresses or ports, protocol types, QoS parameters, payload sizes, sequence numbers, or any other type and form of information.

A security device 100 may comprise one or more input/output interfaces 200. An input or output interface 200 may comprise any type and form of interface and/or connected peripherals, such as a video interface and display; a parallel or serial interface, such as a universal serial bus (USB) interface and a mouse or keyboard, or an external serial AT attachment (eSATA) interface and one or more external storage devices; or any other type and form of interface.

A security device 100 may comprise one or more memory devices 204. Memory 204 may comprise any type and form of memory or storage, including random access memory (RAM), hard drive storage, solid state drive storage, flash memory, optical or magneto-optical storage, tape storage, or any other type and form of storage device.

In some implementations, a security device 100 may execute an application 208. Application 208 may comprise an applet, server, daemon, service, routine, or other executable log for generating transactions, performing cryptographic hashing algorithms, and communicating with nodes of a distributed ledger. In some implementations, application 208 may provide a user interface via a display or other I/O device 200. User interfaces may provide a user or administrator with access to log information, configuration settings, and/or control (e.g. quarantine a suspect device, authorize canonical versions of data, or any other such controls). In some implementations, application 208 may comprise a web browser, and a user interface may comprise a web page maintained by a web server (not illustrated) stored in memory and executed by the security device 100. This may also allow access to user interfaces from computing devices 102 on a local network. In other implementations, application 208 may comprise a standalone application, such as a Java application. In some implementations, application 208 may control other output devices.

In some implementations, a security device 100 may have an encryption module 214. Encryption module 214, sometimes referred to as an encryption co-processor, a cryptographic accelerator, a secure cryptoprocessor, or a trusted platform module (TPM), may comprise hardware for efficiently performing encryption and decryption or calculation of cryptographic hash results. Encryption co-processors may be more efficient, faster, and/or use less power than general purpose processors 202 when performing encryption, as they typically have dedicated architecture for such calculations. The encryption co-processor circuitry may be an application-specific integrated circuit (ASIC) or similar circuit for performing encryption on a bit stream or data file.

Referring briefly to FIG. 2B, a computing device 102 and/or node 104 may comprise one or more of input/output interfaces 200, processors 202, memory devices 204, and/or network interfaces 206. A computing device 102 and/or node 104 may execute applications 208, as discussed above. In some implementations, a computing device 102 and/or node 104 may have an encryption module 214, while in other implementations, any encryption or decryption or hash calculation may be performed by a processor 202.

Computing devices 102 (as well as node(s) 104) may be identified by a device identifier 218. Device identifier 218 may comprise an alphanumeric string, serial number, MAC address, username or account name, address, GUID, or any other type and form of identifier to distinguish a computing device from other computing devices. In many implementations, device identifier 218 may be set by a manufacturer, while in other implementations, device identifier 218 may be set by an administrator or user (e.g. user name).

Returning to FIG. 2A, in some implementations, a security device 100 may maintain a trusted device database 220. As discussed above, in some implementations, a security device 100 may periodically poll or request hash values of software, firmware, or data from devices on a network (e.g. within a LAN for which the security device provides security and authentication operations). If the hash values match hash values of canonical versions of the software, firmware, or data stored in a distributed ledger, then the security device may add a device identifier 218 of the device (or a hash of a device identifier 218, for privacy and security) to a trusted device database 220 to identify the device as not compromised. In some implementations, the security device 100 may record the device identifier 218 or a hash of the device identifier within a record or array of the distributed ledger, similar to recording the hash values for other data. This allows any other device to retrieve or look up device identifiers 218 within the ledger to verify whether a device is trusted or potentially compromised.

Figure 3:
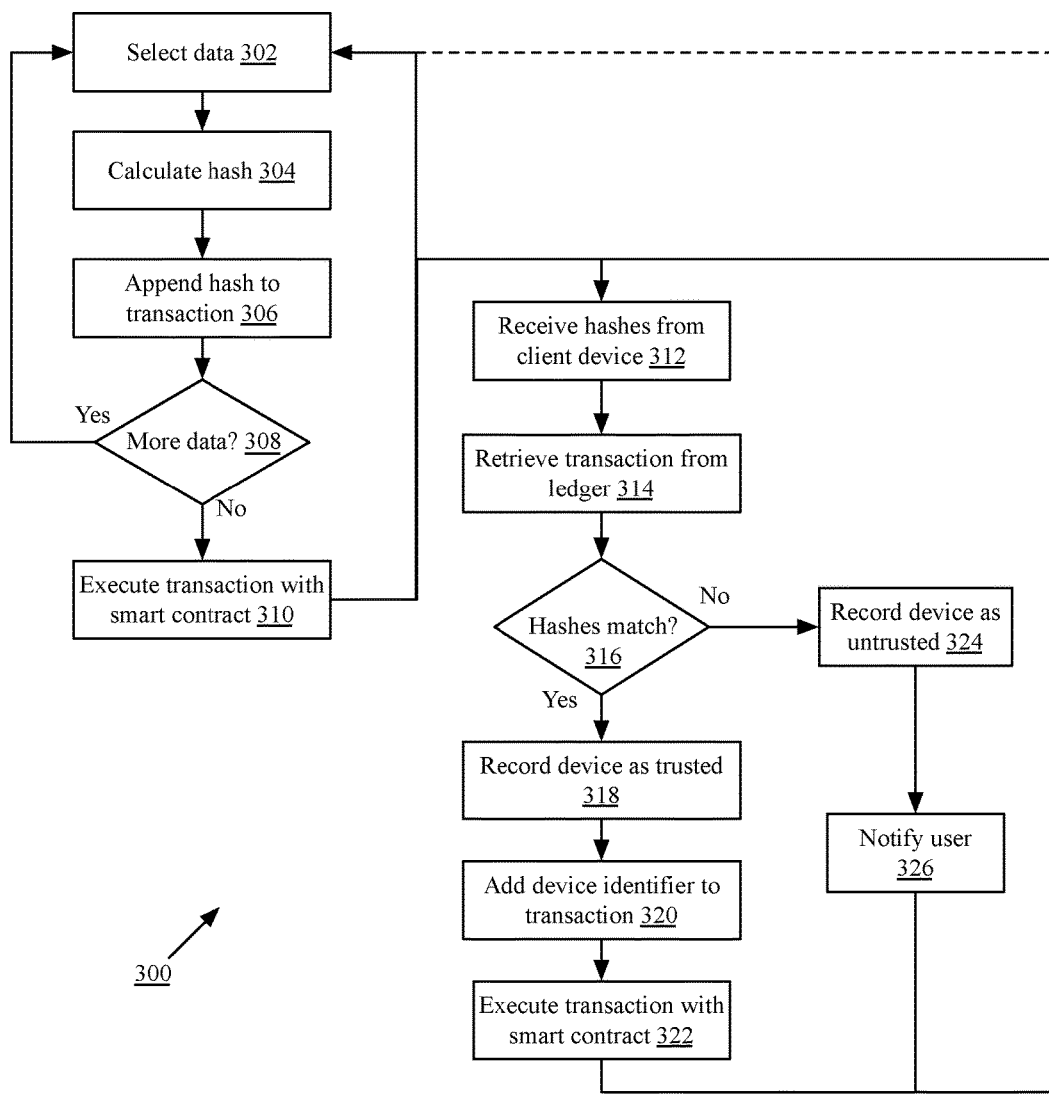
FIG. 3 is a flow chart of an embodiment of a method for secure storage and verification of hashes within a distributed ledger system.

FIG. 3 is a flow chart of an embodiment of a method 300 for secure storage and verification of hashes within a distributed ledger system. Portions of method 300 may be performed by one or more security devices, and/or by other devices such as computing devices 102. For example, in some implementations, a first security device 100 may perform a first portion of method 300 (e.g. steps 302-310) while a second security device 100 may perform a second portion of method 300 (e.g. steps 312-326). For example, a first security device 100 may comprise an administrator or master device provided or maintained by a manufacturer of software or firmware, while a second security device 100 may comprise a device deployed as a gateway to a LAN. In other implementations, a single device may perform all of the steps of method 300.

At step 302, a security device may select data for processing, such as a system file, library, configuration file, firmware, user data file, or any other type and form of data file. In some implementations, data may be selected based on its functionality or relationship to crucial components of the system. For example, crucial operating system files or libraries may be selected, as modification or corruption of these files may allow a system to be compromised. In some implementations, data may be selected based on frequency of appearance in client computing systems (e.g. system files that are common to many devices may be selected, as opposed to user-specific data that may not be common to many devices). In still other implementations, data may be selected for processing when it is created or updated (e.g. new firmware, system updates, etc.).

At step 304, the security device may calculate a hash of the selected data. This may be done by a processor 202 or by an encryption co-processor 214 in various implementations. The security device may use any suitable hashing algorithm that results in few or no collisions for the input data (and may be selected based, for example, on the type and length of input data). For example, in many implementations, a Secure Hash Algorithm (SHA) may be used, such as SHA256 or SHA512.

At step 306, in some implementations, the hash may be appended to a transaction or a transaction generated from the hash. In other implementations, the security device may generate a remote procedure call or request comprising the hash. The security device may include an identifier of the selected data with the hash, such as an application name, version number, URI, or other such identifier or identifiers. In some implementations, a different transaction or request may be generated for each hash, while in other implementations, a plurality of hashes may be concatenated or included in a single transaction or request (e.g. with identifiers or predetermined strings between them, or multiplexed based on constant length, etc.). In such implementations, at step 308, the security device may determine if additional data should be processed. If so, steps 302-308 may be repeated for each additional item of data (e.g. system files, updates, libraries, firmware, etc.).

At step 310, the remote procedure call, request, or transaction may be transmitted to a node for processing. The node may write the hash value(s) and data identifier(s) to a record or array, or may provide the hash value and data identifier(s) as inputs to a smart contract executed by the node, with the output of the contract written to a record or array. The node may write other transactions or perform other executable smart contracts or code, may calculate a hash of one or more prior blocks or a present block of records, and may include the hash value(s) and identifier(s) in a new block. The new block may be broadcast to other nodes of the distributed ledger for use in processing subsequent blocks.

Steps 302-310 may be repeated, either periodically, or as new versions of canonical data are created or modified by a manufacturer or administrator or are identified as canonical by an administrator or user of the system.

At any point after at least one iteration of steps 302-310, at step 312, a security device may receive hash values from one or more client computing devices. Step 312 may be performed periodically and include transmitting or broadcasting a request (e.g. on a LAN) to other computing devices requesting hash values of data, or may include retrieving hash values for the data from the devices. In some implementations, a security device may request hash values for specified data (e.g. a particular system file, library, user data file, configuration file, firmware, or other such data) and may receive corresponding hash value(s) from the client devices. The client devices may generate the hash values locally and provide them to the security device, reducing bandwidth utilization of the LAN, and keeping the underlying data secure and not broadcast over the network.

At step 314, the security device may retrieve hash value or transaction comprising the hash value from the distributed ledger. Retrieving the hash value or transaction may comprise generating a new transaction or request comprising a remote procedure call to be executed by a node, as discussed above. The security device may transmit the request or transaction to the node or another device in communication with the node for execution. In many implementations, the security device may transmit the request or transaction to a plurality of nodes; and one or more nodes may process the request or transaction (with a node that finishes first broadcasting the result to the network). The security device may receive the result after execution by reading a subsequent block. In other implementations, the security device may retrieve a transaction corresponding to the data identifier, the transaction comprising the hash value for the canonical data.

At step 316, the security device may determine whether the hash of the canonical data retrieved from the ledger and the hash received from a client device match. Determining if the hashes match may comprise performing a bitwise XOR on the hashes.

At step 318, if the hashes match, then the security device may record the client device as a trusted device. Recording the device as trusted may comprise adding a device identifier of the device to a trusted device database, notifying other devices, and/or generating a request or transaction at step 320 to provide the distributed ledger comprising the device identifier of the client or a hash of the device identifier (e.g. for privacy and/or security). At step 322, the security device may transmit the request or transaction to the node (or broadcast the request or transaction to a plurality of nodes). Accordingly, in similar steps, other devices may subsequently receive the device identifier of a client device (e.g. as at step 312), and retrieve the ledger or transaction (e.g. as at step 314), and compare the two (or their hashes, as at step 316), in order to verify if a device should be trusted, or is compromised.

If the hashes do not match, then at step 324, in some implementations, the device may be recorded as untrusted, in a device database and/or on the ledger (as at steps 320-322). In some implementations, a user or administrator may be notified of the device's untrusted status at step 326

(e.g. via email, pop-up, or other notifications). Steps 312-326 may be repeated for additional client devices, and may also be repeated periodically to ensure that devices have not been compromised.

Accordingly, in one aspect, the present disclosure is directed to a method for distributed ledger-based secure data verification. The method includes generating, by a processor of a first device, a cryptographic hash of one or more data files in a storage device maintained by the first device. The method also includes appending, by the first device, the first cryptographic hash to a distributed immutable ledger. The method also includes receiving, by the first device from a second device, a second cryptographic hash of a second copy of the one or more data files in a storage device maintained by the second device, and a device identifier of the second device. The method further includes retrieving, by the first device from a third device operating as a full node for the distributed immutable ledger, a portion of the distributed immutable ledger comprising the first cryptographic hash. The method also includes extracting from the retrieved portion, by the first device, the first cryptographic hash. The method also includes comparing, by the first device, the first cryptographic hash and the second cryptographic hash. The method further includes, responsive to the comparison, either: (i) recording the device identifier of the second device as trusted in a device identification database maintained by the first device, if the first cryptographic hash and the second cryptographic hash match, or (ii) recording the device identifier of the second device as untrusted in the device identification database, if the first cryptographic hash and the second cryptographic hash do not match.

In some implementations of the method, generating the cryptographic hash further comprises receiving, from a service provider, a new version of a firmware file, system file, library, or application. In some implementations of the method, appending the first cryptographic hash to the distributed immutable ledger further comprises transmitting the first cryptographic hash to the third device. In a further implementation, transmitting the first cryptographic hash to the third device causes the third device to generate a block of the distributed immutable ledger comprising the first cryptographic hash. In a still further implementation, retrieving the portion of the distributed immutable ledger includes requesting the block.

In some implementations of the method, comparing the first cryptographic hash and the second cryptographic hash includes performing a bitwise exclusive-or comparison of the first cryptographic hash and the second cryptographic hash. In some implementations of the method, recording the device identifier of the second device as trusted in the device identification database, if the first cryptographic hash and the second cryptographic hash match, includes appending the device identifier of the second device to the distributed immutable hash. In some implementations of the method, appending the device identifier of the second device to the distributed immutable ledger includes transmitting the device identifier of the second device to the third device.

In another aspect, the present disclosure is directed to a system for distributed ledger-based secure data verification. The system includes a first device comprising a network interface in communication with a second device and a third device, a storage device comprising one or more data files, and a processor. The processor is configured to generate a cryptographic hash of the one or more data files in the storage device, and append the first cryptographic hash to a distributed immutable ledger. The network interface is configured to: receive, from the second device, a second cryptographic hash of a second copy of the one or more data files in a storage device maintained by the second device, and a device identifier of the second device, and retrieve, from a third device operating as a full node for the distributed immutable ledger, a portion of the distributed immutable ledger comprising the first cryptographic hash. The processor is further configured to: extract the first cryptographic hash from the retrieved portion; compare the first cryptographic hash and the second cryptographic hash; and responsive to the comparison, either: (i) recording the device identifier of the second device as trusted in a device identification database maintained by the first device, if the first cryptographic hash and the second cryptographic hash match, or (ii) recording the device identifier of the second device as untrusted in the device identification database, if the first cryptographic hash and the second cryptographic hash do not match.

In some implementations, the network interface is further configured to receive, from a service provider, a new version of a firmware file, system file, library, or application. In some implementations, the processor is further configured to append the first cryptographic hash to the distributed immutable ledger by transmitting the first cryptographic hash to the third device. In a further implementation, the transmission of the first cryptographic hash to the third device causes the third device to generate a block of the distributed immutable ledger comprising the first cryptographic hash. In a further implementation, the network interface is further configured to retrieve the portion of the distributed immutable ledger by requesting the block.

In some implementations, the processor is further configured to perform a bitwise exclusive-or comparison of the first cryptographic hash and the second cryptographic hash. In some implementations, the processor is further configured to, if the first cryptographic hash and the second cryptographic hash match, append the device identifier of the second device to the distributed immutable hash. In some implementations, the network interface is further configured to transmit the device identifier of the second device to the third device.

Figure 4:
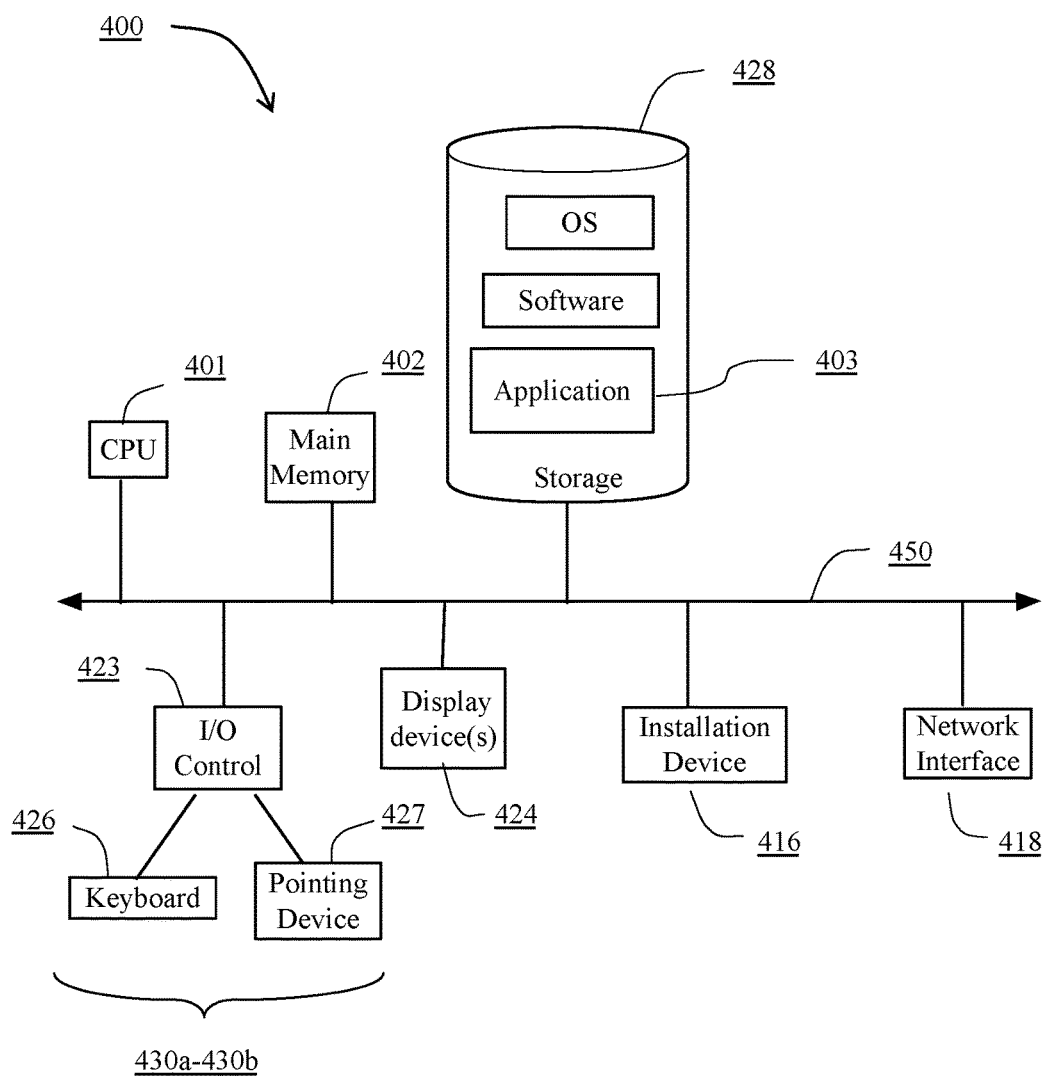
FIG. 4 is a block diagram of an exemplary computing device useful for practicing the methods and systems described herein.

FIG. 4 is a block diagram of an exemplary computing device useful for practicing the methods and systems described herein. The various devices 100, 102, and 104 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device.

FIG. 4 depicts a block diagram of a computing device 400 useful for practicing an embodiment of the security devices and/or client devices discussed above. A computing device 400 may include a central processing unit 401; a main memory unit 402; a visual display device 424; one or more input/output devices 430a-430b (generally referred to using reference numeral 430), such as a keyboard 426, which may be a virtual keyboard or a physical keyboard, and/or a pointing device 427, such as a mouse, touchpad, or capacitive or resistive single- or multi-touch input device; and a cache memory 440 in communication with the central processing unit 401.

The central processing unit 401 is any logic circuitry that responds to and processes instructions fetched from the main memory unit 402 and/or storage 428. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 402 may be one or more memory chips capable of storing data and allowing any storage location to be directly accessed by the microprocessor 401, such as random access memory (RAM) of any type. In some embodiments, main memory unit 402 may include cache memory or other types of memory.

The computing device 400 may support any suitable installation device 416, such as a floppy disk drive, a CD-ROM drive, a CD-R/RW drive, a DVD-ROM drive, tape drives of various formats, USB/Flash devices, a harddrive or any other device suitable for installing software and programs such as a server or application 403 such as a physical security application, network security application, or combination physical and network security application, or portion thereof. The computing device 400 may further comprise a storage device 428, such as one or more hard disk drives or redundant arrays of independent disks, for storing an operating system and other related software, and for storing application software programs.

Furthermore, the computing device 400 may include a network interface 418 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 418 may comprise a built-in network adapter, network interface card, PCMCIA network card, card bus network adapter, wireless network adapter, USB network adapter, cellular modem or any other device suitable for interfacing the computing device 400 to any type of network capable of communication and performing the operations described herein.

A wide variety of I/O devices 430a-430n may be present in the computing device 400. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 430 may be controlled by an I/O controller 423 as shown in FIG. 4. The I/O controller may control one or more I/O devices such as a keyboard 426 and a pointing device 427, e.g., a mouse, optical pen, or multi-touch screen. Furthermore, an I/O device may also provide storage 428 and/or an installation medium 416 for the computing device 400. The computing device 400 may provide USB connections to receive handheld USB storage devices such as the USB Flash Drive line of devices manufactured by Twintech Industry, Inc. of Los Alamitos, Calif.

The computing device 400 may comprise or be connected to multiple display devices 424a-424n, which each may be of the same or different type and/or form. As such, any of the I/O devices 430a-430n and/or the I/O controller 423 may comprise any type and/or form of suitable hardware, software embodied on a tangible medium, or combination of hardware and software to support, enable or provide for the connection and use of multiple display devices 424a-424n by the computing device 400. For example, the computing device 400 may include any type and/or form of video adapter, video card, driver, and/or library to interface, communicate, connect or otherwise use the display devices 424a-424n. A video adapter may comprise multiple connectors to interface to multiple display devices 424a-424n. The computing device 400 may include multiple video adapters, with each video adapter connected to one or more of the display devices 424a-424n. Any portion of the operating system of the computing device 400 may be configured for using multiple displays 424a-424n. Additionally, one or more of the display devices 424a-424n may be provided by one or more other computing devices, such as computing devices 400a and 400b connected to the computing device 400, for example, via a network. These embodiments may include any type of software embodied on a tangible medium designed and constructed to use another computer's display device as a second display device 424a for the computing device 400. One ordinarily skilled in the art will recognize and appreciate the various ways and embodiments that a computing device 400 may be configured to have multiple display devices 424a-424n.

A computing device 400 of the sort depicted in FIG. 4 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 400 may have different processors, operating systems, and input devices consistent with the device. For example, in one embodiment, the computer 400 is an Apple iPhone or Motorola Droid smart phone, or an Apple iPad or Samsung Galaxy Tab tablet computer, incorporating multi-input touch screens. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, JavaScript, or in any byte code language such as JAVA or WebAssembly. The software programs may be stored on or in one or more articles of manufacture as object code.

What is claimed is:

1. A method for distributed ledger-based secure data verification, comprising:
   generating, by a processor of a first device, a cryptographic hash of one or more data files in a storage device maintained by the first device;
   appending, by the first device, the first cryptographic hash to a distributed immutable ledger;
   receiving, by the first device from a second device, a second cryptographic hash of a second copy of the one or more data files in a storage device maintained by the second device, and a device identifier of the second device;
   retrieving, by the first device from a third device operating as a full node for the distributed immutable ledger, a portion of the distributed immutable ledger comprising the first cryptographic hash;
   extracting from the retrieved portion, by the first device, the first cryptographic hash;
   comparing, by the first device, the first cryptographic hash and the second cryptographic hash; and
   responsive to the comparison indicating that the first cryptographic hash and the second cryptographic hash match:
      recording the device identifier of the second device as trusted in a device identification database maintained by the first device by appending the device identifier of the second device to the distributed immutable ledger.

2. The method of claim 1, wherein generating the cryptographic hash further comprises receiving, from a service provider, a new version of a firmware file, system file, library, or application.

3. The method of claim 1, wherein appending the first cryptographic hash to the distributed immutable ledger further comprises transmitting the first cryptographic hash to the third device.

4. The method of claim 3, wherein transmitting the first cryptographic hash to the third device causes the third device to generate a block of the distributed immutable ledger comprising the first cryptographic hash.

5. The method of claim 4, wherein retrieving the portion of the distributed immutable ledger further comprises requesting the block.

6. The method of claim 1, wherein comparing the first cryptographic hash and the second cryptographic hash comprises performing a bitwise exclusive-or comparison of the first cryptographic hash and the second cryptographic hash.

7. The method of claim 1, wherein appending the device identifier of the second device to the distributed immutable ledger further comprises transmitting the device identifier of the second device to the third device.

8. A system for distributed ledger-based secure data verification, comprising:
   a first device comprising a network interface in communication with a second device and a third device, a storage device comprising one or more data files, and a processor;
   wherein the processor is configured to:
      generate a cryptographic hash of the one or more data files in the storage device, and
      append the first cryptographic hash to a distributed immutable ledger;
   wherein the network interface is configured to:
      receive, from the second device, a second cryptographic hash of a second copy of the one or more data files in a storage device maintained by the second device, and a device identifier of the second device, and
      retrieve, from a third device operating as a full node for the distributed immutable ledger, a portion of the distributed immutable ledger comprising the first cryptographic hash;
   wherein the processor is further configured to:
      extract the first cryptographic hash from the retrieved portion,
      compare the first cryptographic hash and the second cryptographic hash, and
      responsive to the comparison indicating that the first cryptographic hash and the second cryptographic hash match:
         recording the device identifier of the second device as trusted in a device identification database maintained by the first device by appending the device identifier of the second device to the distributed immutable ledger.

9. The system of claim 8, wherein the network interface is further configured to receive, from a service provider, a new version of a firmware file, system file, library, or application.

10. The system of claim 8, wherein the processor is further configured to append the first cryptographic hash to the distributed immutable ledger by transmitting the first cryptographic hash to the third device.

11. The system of claim 10, wherein the transmission of the first cryptographic hash to the third device causes the third device to generate a block of the distributed immutable ledger comprising the first cryptographic hash.

12. The system of claim 11, wherein the network interface is further configured to retrieve the portion of the distributed immutable ledger by requesting the block.

13. The system of claim 8, wherein the processor is further configured to perform a bitwise exclusive-or comparison of the first cryptographic hash and the second cryptographic hash.

14. The system of claim 8, wherein the network interface is further configured to transmit the device identifier of the second device to the third device.

* * * * *